(12) United States Patent
Livingston et al.

(10) Patent No.: US 10,844,285 B1
(45) Date of Patent: Nov. 24, 2020

(54) REMEDIATION OF ORGANIC WASTES BY THERMAL DEGRADATION OF POLYFLUOROALKYL AND MICROPLASTIC CONTAMINANTS

(71) Applicant: Smart Terra Care, LLC, Independence, KS (US)

(72) Inventors: Andrew Livingston, Independence, KS (US); Nathan Coltrane, Independence, KS (US); Bijoy Thomas, Independence, KS (US)

(73) Assignee: Smart Terra Care, LLC, Independence, KS (US)

( * ) Notice: Subject to any disclaimer, the term of this patent is extended or adjusted under 35 U.S.C. 154(b) by 0 days.

(21) Appl. No.: 16/880,313

(22) Filed: May 21, 2020

(51) Int. Cl.
*C10B 1/10* (2006.01)
*C10B 47/30* (2006.01)
*C10B 53/07* (2006.01)
*C10L 5/40* (2006.01)
*B01J 6/00* (2006.01)

(52) U.S. Cl.
CPC .............. *C10B 53/07* (2013.01); *B01J 6/008* (2013.01); *C10B 47/30* (2013.01); *C10L 5/406* (2013.01); *C10B 1/10* (2013.01); *C10L 2200/0461* (2013.01); *C10L 2290/02* (2013.01); *C10L 2290/06* (2013.01)

(58) Field of Classification Search
CPC .......... C10B 53/07; C10B 47/30; C10B 1/06; C10B 1/10; C02F 11/10; F23G 5/04; F23G 5/0273; C10L 5/406; C10L 2290/02; B01J 6/008
See application file for complete search history.

(56) References Cited

U.S. PATENT DOCUMENTS

| | | | | |
|---|---|---|---|---|
| 3,859,933 A | * | 1/1975 | Von Klenck | F23G 5/0273 110/226 |
| 4,026,678 A | * | 5/1977 | Livingston | C10L 5/46 44/589 |
| 4,303,477 A | * | 12/1981 | Schmidt | A62D 3/40 106/752 |
| 4,384,923 A | * | 5/1983 | Hillekamp | B09B 3/00 201/21 |

(Continued)

OTHER PUBLICATIONS

Angela N. García, Noemi Viciano, Rafael Font, "Products obtained in the fuel-rich combustion of PTFE at high temperature", Journal of Analytical and Applied Pyrolysis, vol. 80, Issue 1, 2007, pp. 85-91, ISSN 0165-2370, https://doi.org/10.1016/j.jaap.2007.01.004. (Year: 2007).*

(Continued)

*Primary Examiner* — Jonathan Luke Pilcher
(74) *Attorney, Agent, or Firm* — Hovey Williams LLP (57) ABSTRACT

A reactor (16) for the remediation of polyfluoroalkyl- and/or microplastic-contaminated feedstocks includes an elongated, horizontally oriented, axially rotatable drum (34) having a shell (72) within a housing (32), with a feedstock input assembly (38) adjacent one end of the drum (34) and a feedstock output assembly (40) adjacent the opposite end thereof. A burner (94) within the housing (32) generates hot combustion gases which surround the drum (34) in order to conductively heat feedstock passing through the drum (34). The invention substantially completely remediates the feedstocks through volatilization of the contaminants.

14 Claims, 7 Drawing Sheets

(56) References Cited

U.S. PATENT DOCUMENTS

| | | | | |
|---|---|---|---|---|
| 4,439,209 A * | 3/1984 | Wilwerding | ............ | B29B 17/04 202/218 |
| 4,696,116 A * | 9/1987 | Livingston | ............ | F26B 11/022 34/108 |
| 4,729,176 A * | 3/1988 | Shinn | .................. | F26B 11/0413 34/128 |
| 4,802,288 A * | 2/1989 | Shinn | .................. | F26B 11/0413 34/129 |
| 4,864,942 A * | 9/1989 | Fochtman | ............. | B09B 3/0091 110/226 |
| 4,945,657 A * | 8/1990 | Shinn | .................. | F26B 11/0413 34/128 |
| 5,555,639 A * | 9/1996 | Livingston | .......... | F26B 11/0413 34/135 |
| 8,198,493 B1 * | 6/2012 | Livingston | ............. | C10B 47/30 201/25 |
| 8,388,813 B1 * | 3/2013 | Livingston | ................ | C10B 1/10 202/117 |
| 8,795,475 B2 * | 8/2014 | Hutchins | .................. | C10B 1/10 201/25 |
| 2010/0133085 A1 * | 6/2010 | Hutchins | ................. | C10B 47/30 201/3 |

OTHER PUBLICATIONS

Kucharzyk et al. "Novel treatment technologies for PFAS compounds: A critical review." Journal of Environmental Management xxx (2017) pp. 1-8.

Mahon et al. "Microplastics in Sewage Sludge: Effects of Treatment." Environ. Sci. Technol., Just Accepted Manuscript • DOI: 10.1021/ACS.EST.6B04048 • Publication Date (Web): Dec. 12, 2016 (downloaded from http://pubs.acs.org on Dec. 14, 2016).

Wang et al. "Mineralization Behavior of Fluorine in Perfluorooctanesulfonate (PFOS) during Thermal Treatment of Lime-Conditioned Sludge." Environ. Sci. Technol. 2013, 47, 2621-2627; dx.doi.org/10.1021/es305352p.

Yu et al. "Fate of Per- and Polyfluoroalkyl Substances (PFAS) during Hydrothermal Liquefaction of Municipal Wastewater Treatment Sludge." Environ. Sci.: Water Res. Technol., 2020; DOI: 10.1039/C9EW01139K.

https://cleanearthinc.com/contaminated-soil-treatment; downloaded May 11, 2020.

* cited by examiner

REMEDIATION OF ORGANIC WASTES BY THERMAL DEGRADATION OF POLYFLUOROALKYL AND MICROPLASTIC CONTAMINANTS

BACKGROUND OF THE INVENTION

Field of the Invention

The present invention is broadly concerned with methods and apparatus designed for the remediation or removal of contaminants (generally referred to as PFAS) and/or microplastics (MPs) by heating of contaminated feedstocks so that the contaminants are separated as volatile organic compounds (VOCs), leaving valuable biochar final products. More particularly, the invention is concerned with such methods and apparatus whereby the contaminated feedstocks are conductively heated in a specialized thermal reactor.

Description of the Prior Art

PFAS are defined as per- and polyfluoroalkyl substances or compounds, typically in the form of synthetic organofluorines having multiple fluorine atoms attached to alkyl chains. As such, they contain at least one perfluoroalkyl moiety, —$C_nF_{2n}$—. According to the Organization for Economic Cooperation and Development (OECD), there are at least 4,730 different PFAS compounds.

PFAS are used in a wide range of industrial and consumer applications, leading to their widespread release into the environment. This raises serious concerns owing to the high stability of PFAS, bioaccumulation potential, and documented human health effects. The United States EPA issued a lifetime Health Advisory Level of 70 ng/L for perfluorooctanoic acid (PFOA) and perfluorooctane sulfonate (PFOS) combined.

Domestic and industrial waste waters are major sources for release of PFAS to the natural environment, and PFAS concentrations of hundreds of ng/L have been measured in treated wastewater effluent. Perfluoroalkyl acids (PFAAs) like PFOA and PFOS are not biodegradable during conventional wastewater treatment operations, and effluent concentrations may exceed influent concentrations due to the biotransformation of precursor compounds into PFAAs.

The dominant removal mechanism for PFAS during wastewater treatment is sorption to primary and secondary sludge solvents, driven by a combination of hydrophobic and electrostatic interactions. This can lead to accumulation of highly persistent chemicals in the sludges, with concentrations of frequently detected PFOA and PFOS exceeding 1000 ng/g dry solids. High recalcitrance of PFAS to degradation is also documented during conventional wastewater solids management processes, including dewatering and anaerobic digestion, raising further concerns about the environmental and human health risks posed by the reuse of biosolids (e.g., agricultural land applications). Thus, more effective strategies are needed to beneficially re-purpose wastewater sludge residuals, while preventing re-release of PFAS to the environment.

A small number of studies have focused on actively degrading PFAS sorbed to wastewater sludge, and most of the technology developed for aqueous PFAS treatment are not applicable for treating wet sludges. These have included microwave and dry thermal treatments, with lime amendment to degrade PFOS. Other efforts involve hydrothermal liquification for energy recovery from wastewater sludges, where elevated temperatures and pressures are applied to convert organic materials in wet sludge into a liquid bio-crude oil that can be upgraded to transportation fuels. This treatment has some effect on the PFAS content of the sludges, but is not a complete answer to the problem. J. Yu, A. Nickerson, Y. Li, Y. Fang and T. J. Strathmann, "Fate of Per- and Polyfluoroalkyl Substances (PFAS) during Hydrothermal Liquefaction of Municipal Wastewater Treatment Sludge." Environ. Sci.: Water Res. Technol., 2020; DOI: 10.1039/C9EW01139K. Fei Wang, Kaimin Shih, Xinwen Lu, and Chengshuai Liu, "Mineralization Behavior of Fluorine in Perfluorooctanesulfonate (PFOS) during Thermal Treatment of Lime-Conditioned Sludge." Environ. Sci. Technol. 2013, 47, 2621-2627; dx.doi.org/10.1021/es305352p.

A low-temperature thermal desorption process for treating contaminated soils in a rotary treater is described at https://cleanearthinc.com/contaminated-soil-treatment.

Another source of widespread pollution is the presence of microplastics in sludges and similar wastes. Tiny pieces of plastic (5 mm or smaller) are termed microplastics, and can be categorized by their source. Primary MPs are purposely made to a small size (e.g., microbeads made from polyethylene, polypropylene, polyesters, or nylon), whereas secondary MPs are bits of plastic that break down from larger pieces, such as by weathering, sunlight, or physical stress. There is another group of MPs that has recently been discovered, that come from human use of objects, such as by wearing of synthetic fiber clothing.

MPs are so small that they are usually not eliminated by water filtration and thereby make their way into rivers and oceans. Further, these products ultimately end up in organic wastes, such as wastewater sludges and the like. These MPs do not biodegrade to any appreciable extent and thus present an increasingly difficult environmental problem.

Attempts to remediate MPs from organic solids include anaerobic digestion, thermal drying, or lime stabilization processes. See, Anne Marie Mahon, Brendan O'Connell, Mark G. Healty, Ian O'Connor, Rick Office, Roisin Nash, and Liam Morrison, "Microplastics in Sewage Sludge: Effects of Treatment." Environ. Sci. Technol., Just Accepted Manuscript•DOI: 10.1021/ACS.EST.6B04048•Publication Date (Web): 12 Dec. 2016 (downloaded from http://pubs.acs.org on Dec. 14, 2016.

There is accordingly a real and unsatisfied need in the art for improved, industrial scale processes and equipment for the economical treatment of wastewater sludges and other PFAS- and/or MP-contaminated solids, in order to remediate such contaminants.

SUMMARY OF THE INVENTION

In one aspect of the invention, methods are provided for remediating the PFAS and/or MP content of feedstocks, comprising the steps of passing feedstock into a rotating thermal reactor, and moving the feedstock along the length of the reactor. Simultaneously, the walls of the thermal reactor are heated during rotation thereof so as to conductively heat the feedstock during the movement thereof along the reactor. This heating is sufficient to substantially volatilize the PFAS and/or MP content of the feedstock, which can then be recovered from the reactor. Preferably, the thermal reactor relies only on conductive heating for the thermal treatment of feedstocks.

In certain embodiments, the heating is sufficient to volatilize at least about 95% by weight of said PFAS and/or MP content, and more preferably at least about 99% by weight thereof. Normally, the methods involve heating the feedstock while substantially maintaining the contact of the feedstock with the conductively heated walls. To this end, the feedstock is not lifted using internal flights or the like during treatment in the reactor. However, the feedstock may be mixed by provision of static mixing elements which do not cause separation of the feedstock from the walls of the reactor.

Reactor heating and consequent conductive heating of the feedstock may be accomplished by the use of a fuel-fired burner which generates hot combustion gases which surround the outer surfaces of the rotating thermal reactor. This heating is typically carried out to achieve a feedstock temperature of from about 300-1400° F., more preferably from about 750-1100° F.

The thermal reactor is rotated at a relatively slow speed during the method, on the order of from about ¼-10 rpm, more preferably from about ½-4 rpm. The residence time of the feedstock with the reactor is from about 8-25 minutes, more preferably from about 12-16 minutes. Advantageously, the heating of the feedstock within the reactor is carried out in an oxygen-starved environment, e.g., the environment having no more than about 10% by volume atmospheric air therein.

In another aspect of the invention, a thermal reactor is provided comprising an elongated, generally horizontally oriented housing, with an elongated tubular reactor within the housing, presenting an inner surface and an outer surface, with a feedstock input adjacent one end thereof and a feedstock output adjacent the opposite end thereof. Structure is also provided to axially rotate the tubular reactor, along with a heating assembly (e.g., a fuel-fired burner within the housing) operable to heat the outer surface of the tubular reactor whereby feedstock passing through the tubular reactor is conductively heated.

In certain embodiments, the tubular reactor has a shell between the feedstock input and output assemblies, with feedstock mixing elements within the shell. These elements are operable to mix the feedstock passing through the tubular reactor so that no more than about 10% by weight of the feedstock within the reactor shell is separated from the shell during any complete rotation thereof, based upon the total weight of the feedstock within the shell taken as 100% by weight. The mixing elements may include elongated pins having a length of from about 2-12 inches and a diameter of from about ½-1 inch, but these dimensions are not critical. Other mixing elements may be in the form of convex bar elements within the reactor shell.

While the drawings do not necessarily provide exact dimensions or tolerances for the illustrated components or structures, FIGS. 1-6 are to scale with respect to the relationships between the components of the structures illustrated therein.

DETAILED DESCRIPTION OF THE PREFERRED EMBODIMENTS

The present invention provides methods and apparatus for the treatment of a variety of different solids contaminated with PFAS and/or MP, in order to remediate or substantially remove these contaminants from the solids. For example, the invention is particularly suited for the treatment of wastewater sludges in order to provide a biochar output which is essentially free of PFAS and/or MPs.

Figure 7:
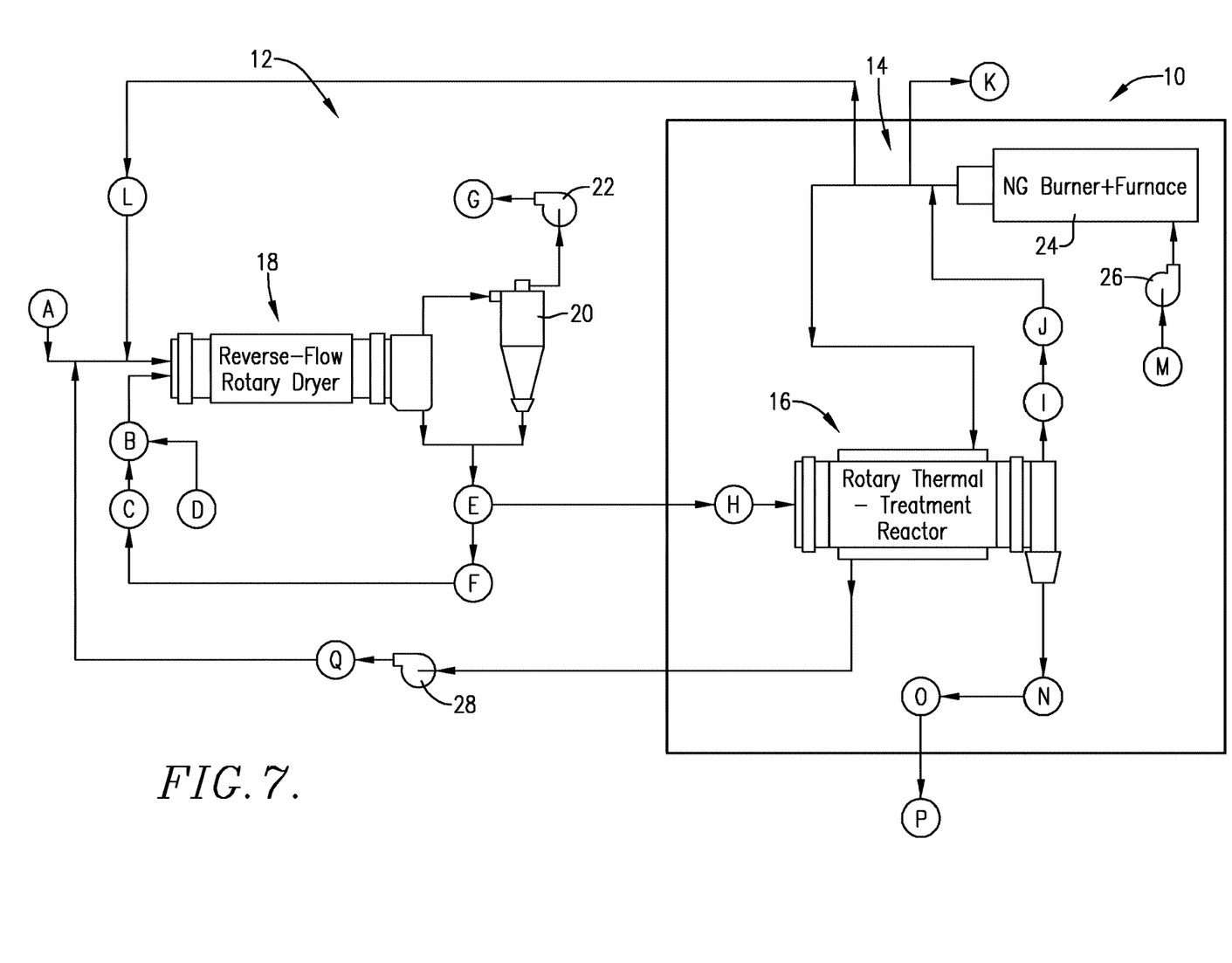
FIG. 7 is a schematic flow diagram illustrating the important components and operation of an overall drying and contaminant remediation system in accordance with the invention.

An overall system 10 for such treatments is schematically illustrated in FIG. 7 and includes a drying assembly 12 and a contaminant remediation assembly 14, the latter including a rotary thermal treatment reactor 16. The drying assembly 12 is needed when the incoming product to be treated is wet, e.g., at least about 60% by weight water, in order to reduce the water content to a level of about 20% by weight or less. However, if an incoming product is already in a dry or semi-dry condition, the drying assembly 12 is not needed.

Broadly speaking, the drying assembly 12 may include a reverse-flow rotary dryer 18 of the type described in U.S. Pat. No. 7,155,841, incorporated by reference herein in its entirety. In addition, the assembly 12 would typically include a cyclone separator 20 and an output fan 22. However, other types of drying assemblies could be employed, so long as they are capable of delivering an adequately dried product to the remediation assembly 14. The remediation assembly 14 has, in addition to the reactor 16, a natural gas VOC burner/furnace 24 as well as fans 26 and 28.

Attention is next directed to FIGS. 1-6 which illustrate the reactor 16. In general, this reactor includes a lower frame assembly 30, an insulated outer housing 32, an elongated, axially rotatable drum 34 located within housing 32, a drive unit 36 for rotation of the drum 32, an air-heating assembly 37, respective product input and output assemblies 38 and 40, and a hot gas exhaust assembly 42.

The frame assembly 30 includes elongated, fore-and-aft extending, laterally spaced apart rails 44 and 46, endmost cross-rails 48 and 50, upstanding rigid support legs 52, and adjustable legs 53. The assembly 30 is designed to support all of the remainder of the reactor 16 in an above-grade, substantially horizontal orientation (e.g., plus-or-minus 5° from true horizontal).

Figure 4:
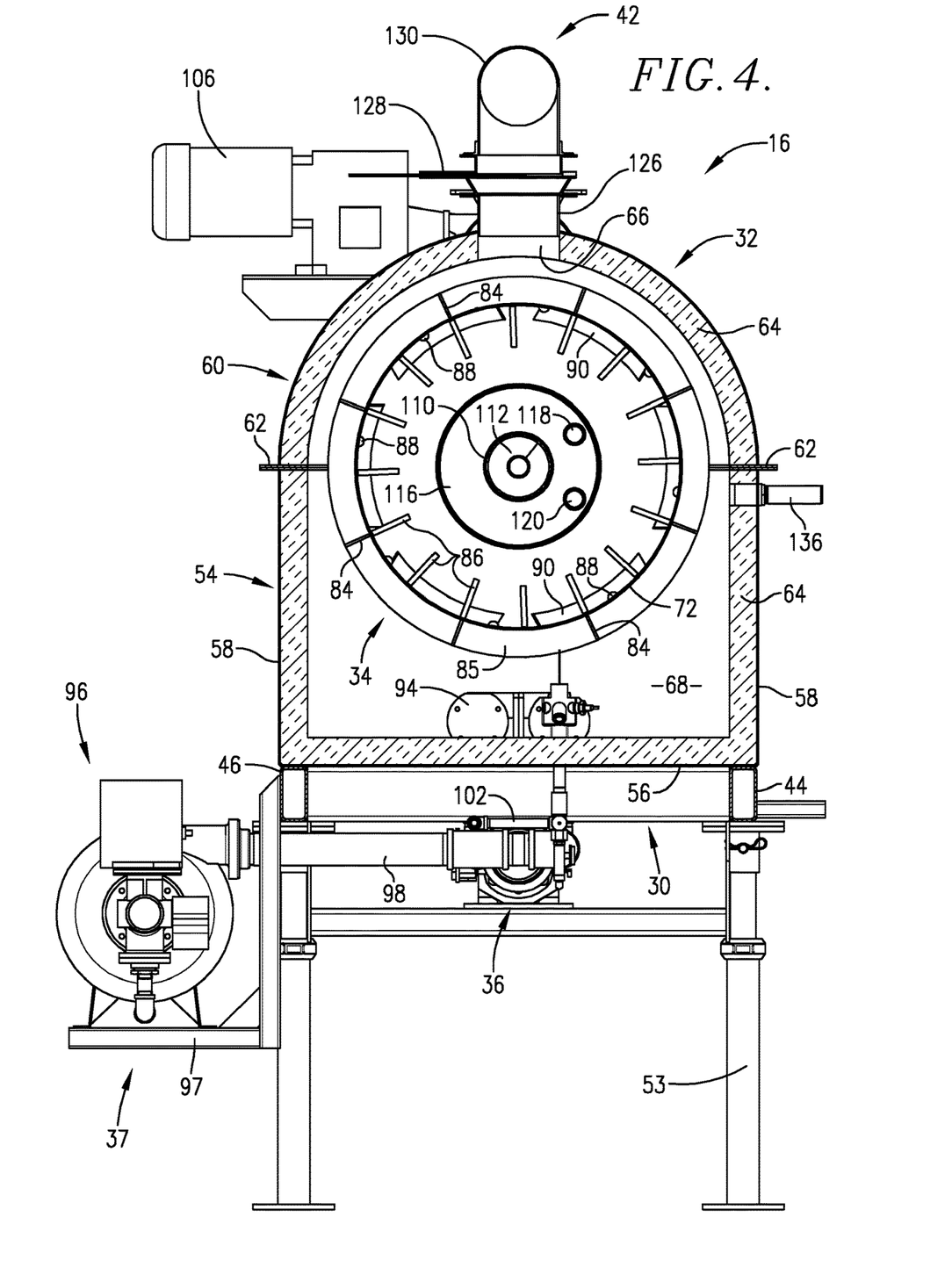
FIG. 4 is a vertical sectional view taken along the line 4-4 of FIG. 3.

The housing 32 includes a U-shaped bottom section 54 presenting a bottom wall 56 and upstanding sidewalls 58. The section 54 is surmounted by a generally U-shaped upper section 60. The section 60 is secured to the upper end of the sidewalls 58 by flanged connectors 62. As best seen in FIG. 4, the sections 54 and 60 are provided with heat insulation 64, and the section 60 is equipped with four spaced apart gas outlets 66 along the length thereof. A pair of insulated and apertured end walls 68 and 70 complete the housing 32.

Figure 5:
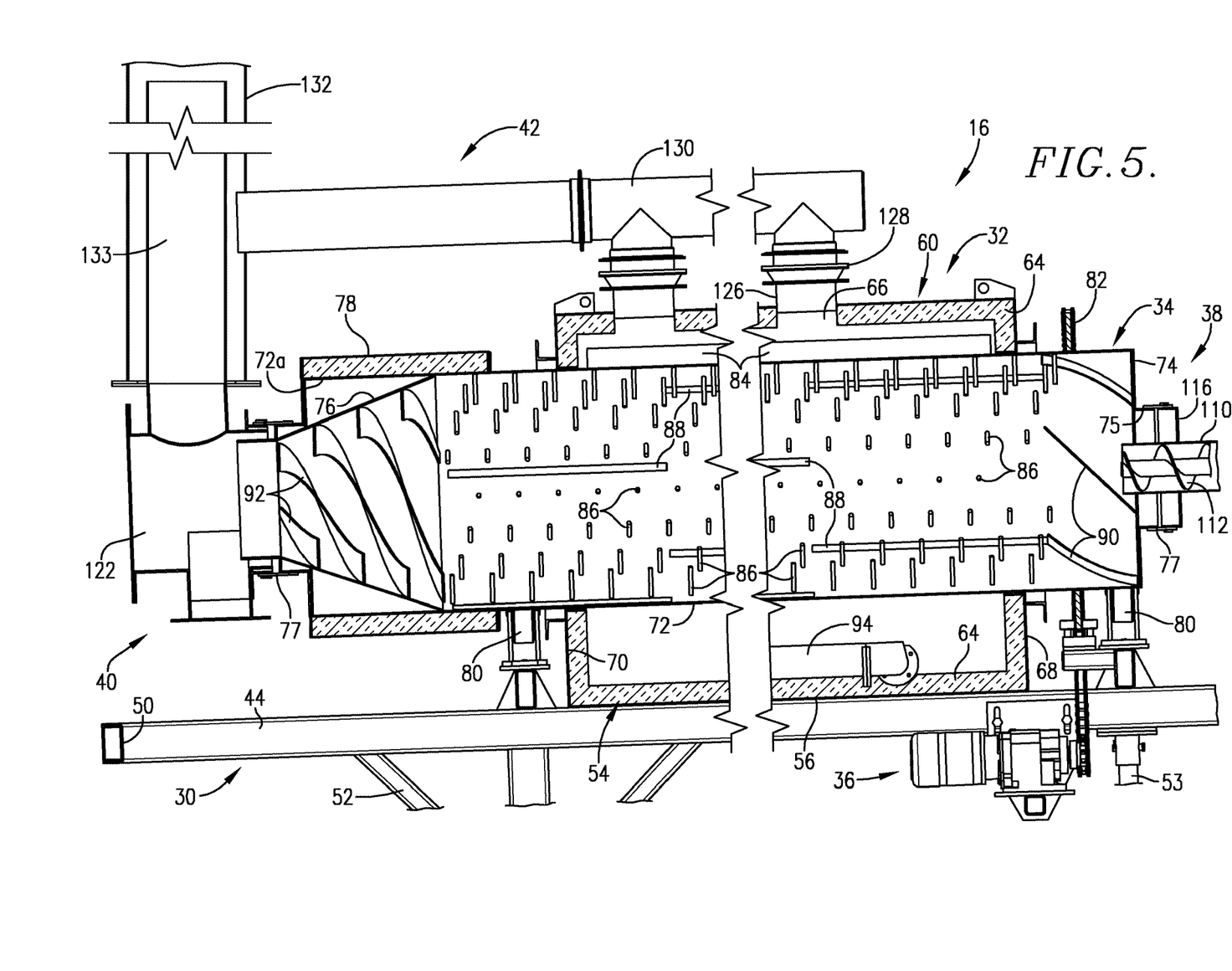
FIG. 5 is a vertical sectional view of the reactor of FIGS. 1-4, with parts broken away.
Figure 6:
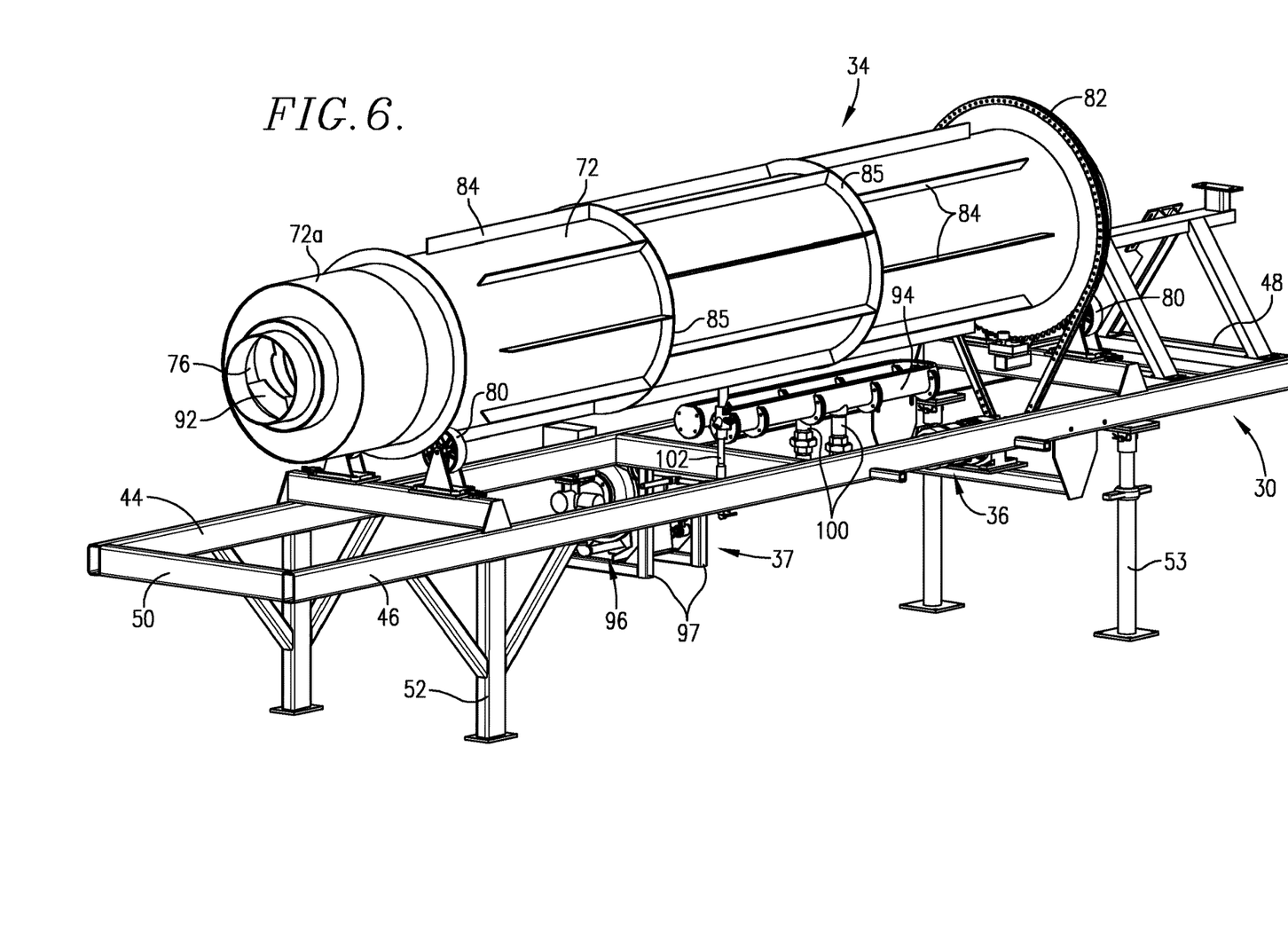
FIG. 6 is a perspective view of the inner drum of the reactor.

The drum 34 includes an elongated, tubular, metallic shell 72, which is positioned within the housing 32 for rotation therein. The overall drum 34 also has an input end wall 74 and an output end frustoconical wall 76, the latter being located within a secondary, stationary, insulated tubular end housing 78. The drum 34 is rotationally supported by fore-and-aft pairs of trunnions 80 secured to the frame assembly 30. The drive assembly 36 comprises a conventional motor and chain drive unit 82 serving to axially rotate the drum 34 during operation of the reactor 16.

The outer surface of the shell 72 is equipped with a series of circumferentially spaced apart, outwardly extending, metallic heat-conducting fins 84, with intermediate annular metallic rings 85. The inner surface of the shell 72 is provided with a large number of inwardly extending, substantially radially oriented, and heat-conducting mixing pins 86 as well as a series of elongated, semi-circular, convex blending bars 88 welded to the shell 72.

The input end of drum 34 includes a plurality of spirally oriented blades 90 serving to move incoming solid product into the main processing section of the drum 34 within housing 32. Correspondingly, the frustoconical wall 76 is equipped with a series of spirally located output vanes 92, which serve to move the treated product from the drum towards the output end of the reactor 16. A stationary stabilizing wall 72a surrounds the wall 76 within the tubular end housing 78.

The air-heating assembly 37 includes a generally U-shaped tubular burner 94 located within the housing 32 along the bottom wall 56 thereof. The burner 94 has outlet openings along the length thereof for directing hot combustion gases into the housing 32 and in surrounding relationship to the drum 34. An external fan unit 96 is located adjacent the housing 32 on L-shaped brackets 97, and has a main outlet pipe 98 leading to a pair of delivery pipes 100 which extend through bottom wall 56 and into the burner 94. Fuel such as natural gas is provided to the burner 94 by means of an L-shaped fuel pipe 102 connected to a fuel source (not shown) and leading to one end of the burner 94.

Input assembly 38 includes an open-top airlock 106 which delivers incoming solid particulate product through a bottom outlet 108, feeding into an auger pipe 110. An axially rotatable input auger 112 is situated within pipe 110 and is rotated by means of a motor and drive assembly 114. The assembly 38 also has an annular shroud 116 surrounding and fixed to auger pipe 110, and is in alignment with collar 75 secured to the end wall 74 of drum 34. A seal 77 is located in the space between the shroud 116 and rotating collar 75 of the drum 34. A pair of normally capped access openings 118, 120 are provided through the shroud 116 for insertion of utilities, such as a thermocouple or water nozzle, into the interior of the drum 34.

The output assembly 40 includes a separator unit 122 in communication with the outer end of the frustoconical wall 76, and has a discharge airlock 124 with a bottom outlet for processed product. A seal similar to seal 77 is located between the output of the drum and the separator unit 122; these seals substantially prevent ingress of atmospheric air into the interior of the reactor. A conventional conveyor or other takeaway apparatus (not shown) is situated below the airlock 124 for conveying processed product from the reactor 16.

Figure 1:
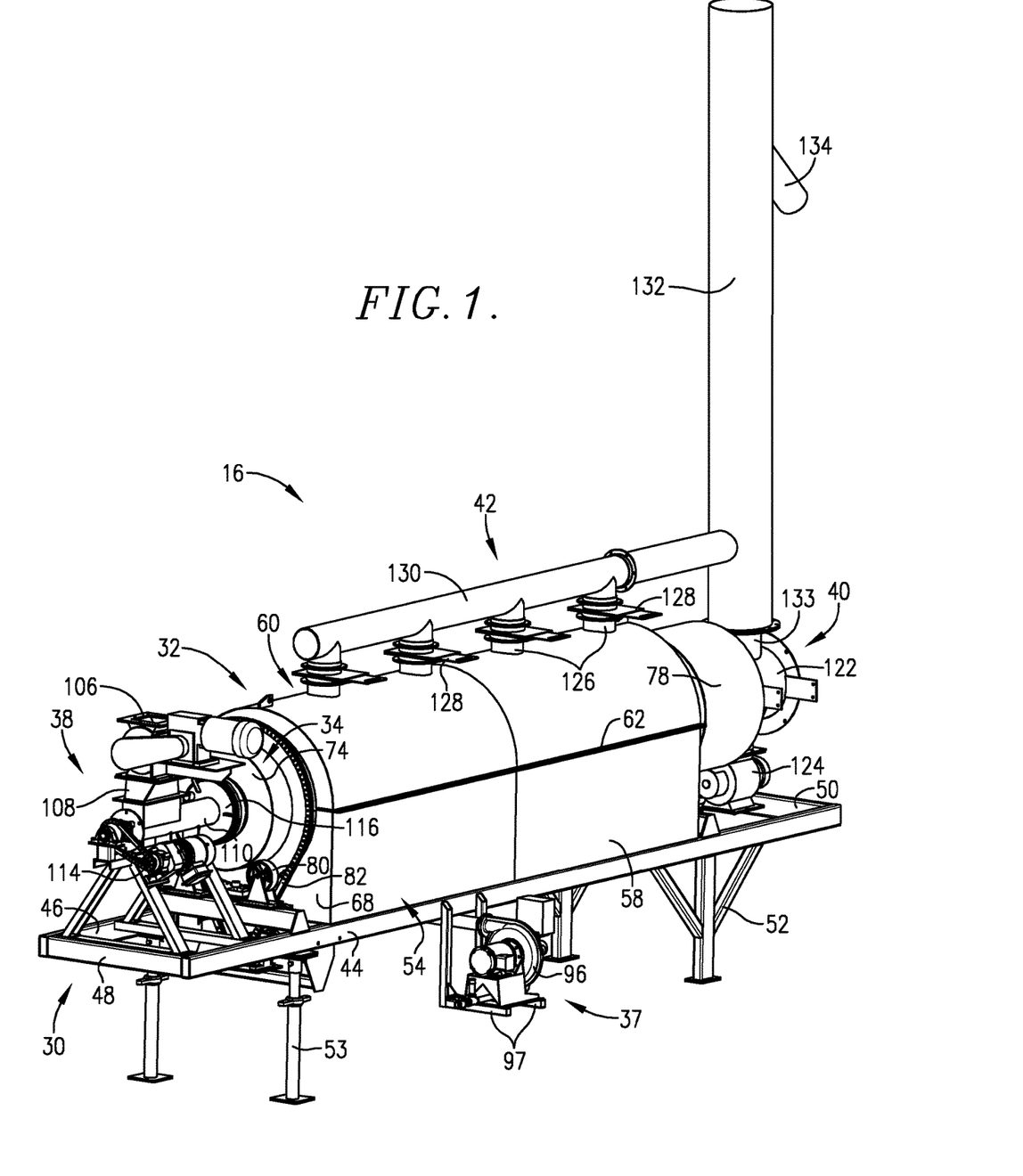
FIG. 1 is a perspective view of a rotary thermal treatment reactor in accordance with the invention, illustrating the input end of the reactor.
Figure 2:
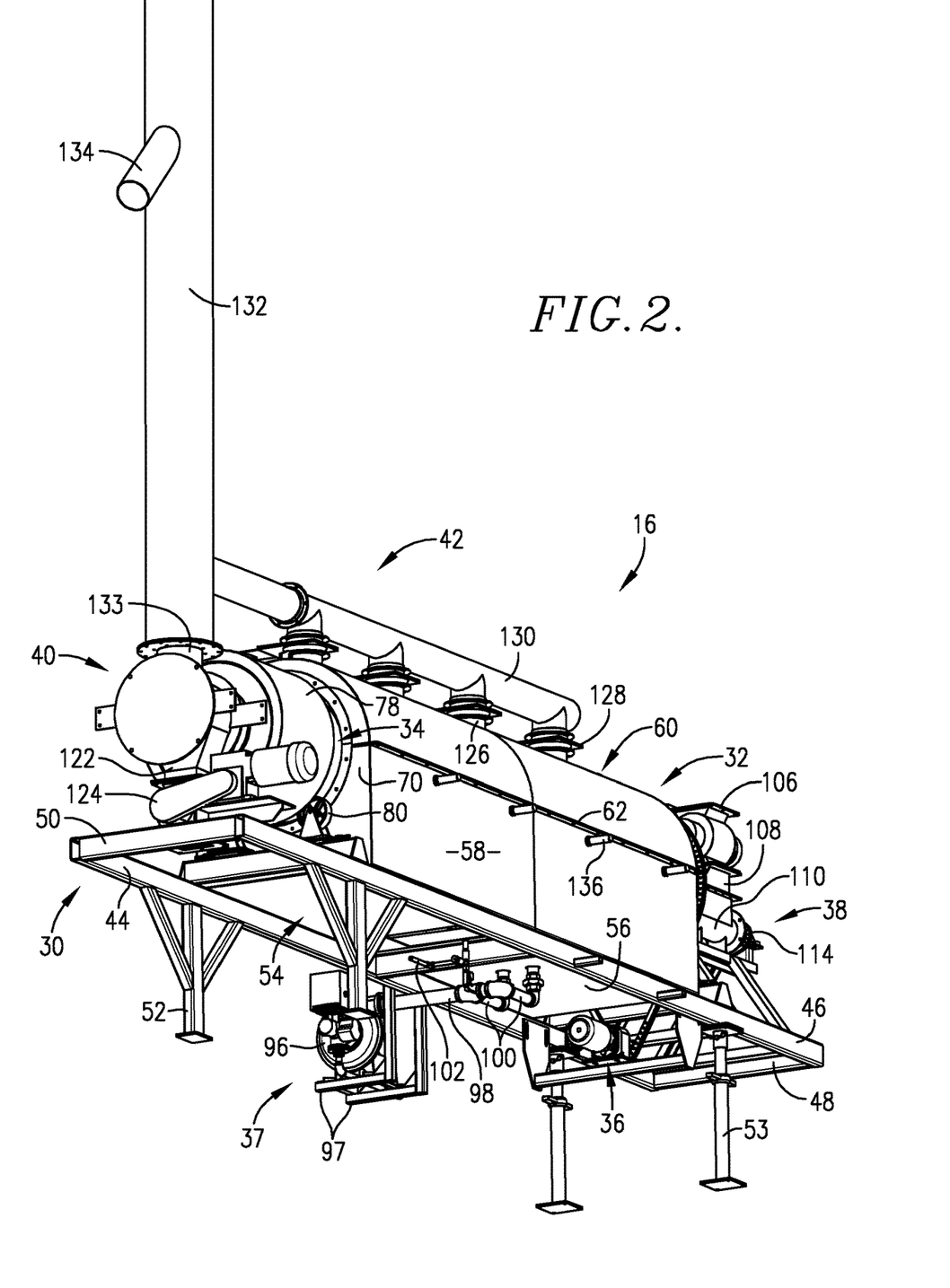
FIG. 2 is a bottom perspective view of the reactor of FIG. 1, and illustrating the output end of the reactor.
Figure 3:
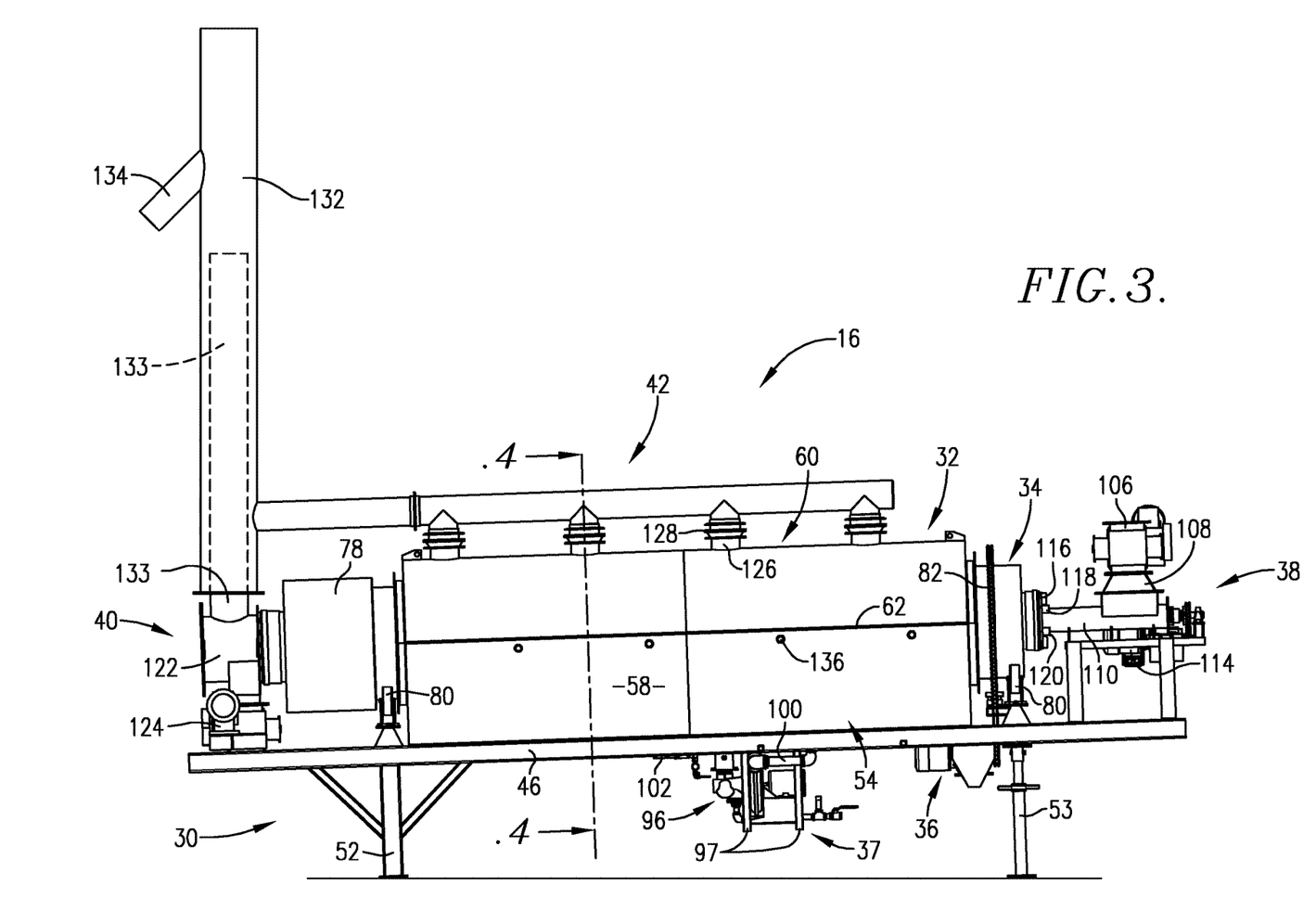
FIG. 3 is an elevational view of the reactor of FIGS. 1 and 2.

The exhaust assembly 42 includes four upstanding tubular hot air discharge outlets 126 respectively positioned within a corresponding gas outlet 66 provided with the housing 32. Each of the discharge outlets 126 has a slide gate 128 allowing control of the flow of hot air therethrough. A common, fore-and-aft extending exhaust conduit 130 is operatively connected with the upper ends of the outlets 126, and extends to the outlet end of the reactor 16. The conduit 130 is in turn connected to an upstanding exhaust stack 132, the latter in communication with the separator unit 122 by means of a coaxial pipe 133, as best seen in FIG. 3. Oxidizer port 134 communicates with the stack 132, as illustrated.

In order to provide enhanced control of reactor 16, a series of thermocouples 136 may be provided along the length of housing 32, and at select points at the input and output assemblies 38 and 40. These thermocouples are used to measure the temperature of the shell 72 without actual contact therewith, and are used to determine average temperatures via a PLC-based control system (not shown). These temperature values may be used to control the heat produced via the burner 94, as well as controlling the rotational speed of the drum 34.

In operation, the drum 34 receives sized biomass feedstock, which is typically of substantially uniform size via the input assembly 38. This feedstock should have a moisture content of up to about 20%, more preferably up to about 10%, and most preferably up to about 5% by weight, based upon the total weight of the feedstock taken as 100% by weight. The feedstock passes along the length of the drum 34 to the output assembly 40. During such travel, the drum 34 is rotated at a relatively low speed, usually from about ¼-10 rpm, more preferably from about ½-4 rpm, and the burner 94 is actuated to generate hot combustion gases within the housing 78 in order to heat the interior of the drum 34 and the feedstock via conduction through the shell 72. The temperature conditions within the shell are maintained at a level of from about 300-1400° F., more preferably from about 750-1100° F.

In order to achieve the most efficient conductive heating of the feedstock, the external fins 84 and rings 85 are provided, along with the internal pins 86 and blending bars 88. Importantly, these internal components are designed to mix the feedstock during processing thereof, but without any substantial lifting or separation of the feedstock from contact with the shell 72. That is, the drum 34 is essentially devoid of any type of lifting flights common in conventional rotary dryers; in practice, no more than about 10%, preferably no more than about 5%, by weight of the feedstock within the shell 72 is separated from the inner surface of the shell during any complete rotation thereof, based upon the total weight of the feedstock in the shell taken as 100% by weight.

The average residence time of the feedstock within the drum 34 is dependent upon the rotational speed of the drum, and the positive angle of inclination of the drum (typically from about 1-4°, more usually from about 2-3°), from the input assembly to the output assembly. This residence time normally varies from about 8-25 minutes, more preferably from about 12-16 minutes.

The drum seals 77 minimize the ingress of atmospheric air into the drum 34, thereby creating an oxygen-starved environment therein; i.e., the atmosphere within the drum 34 should have no more than about 10% by volume of atmospheric air therein. Owing to this condition and the thermal input to the drum, the feedstock undergoes substantial devolatilization of VOCs including PFAS and/or MPs during passage through the drum. In the case of PFAS compounds, there is a breakage of carbon-fluorine bonds prevalent therein, thereby effecting remediation of the feedstock. This treatment also serves to remove substantially all MPs from the feedstock by virtue of volatilization. The VOCs liberated in the process also assist in the creation of an inert atmosphere within the drum 34, which are then thermally oxidized in an external burner/furnace. The waste heat ejected from the reactor may be utilized in a suitable dehydration system to recover sensible heat.

The temperature of the thermally treated biomass exiting the reactor 16 may be above the spontaneous ignition temperature thereof, and is transferred to an oxygen-starved cooling system, so that the final product is at a lower temperature on the order of 80-120° F.

EXAMPLES

Example 1

This is a hypothetical, computer-based example using the system 10 of FIG. 7 with a drying assembly 12 and remediation assembly 14. The system 10 receives a biomass of specific properties and produces a salable biochar output, at a rate of 5,262 tons per year. For this example, the biomass was in the form of chips having dimensions less than or equal to 0.5"×0.5"×0.375" and having a moisture content of 75% wet basis.

Referring to FIG. 7, locations A-Q are indicated throughout the system 10. The following legend sets forth the mass-energy balances for the process at the respective locations.

A—Makeup Air to Rotary Dryer 18
  12,141 SCFM
  35° F.
B—Infeed to Rotary Dryer 18
  61.46% moisture
  9,963 lbs/hr solids
  16,888 lbs/hr water
  25,850 lbs/hr total
C—Reclaimed Biosolids to Dryer 18
  5.00% moisture
  4,750 lbs/hr solids
  250 lbs/hr water
  5,000 lbs/hr total
D—Wet Biosolids Infeed to Dryer 18s
  75.00% moisture
  5,213 lbs/hr solids
  15,638 lbs/hr water
  20,851 lbs/hr total
E—Dryer Output
  5.00% moisture
  9,963 lbs/hr solids
  524 lbs/hr water
  10,487 lbs/hr total
  120° F.
F—Reclaimed Biosolids to Dryer 18
  5.00% moisture
  5,000 lbs/hr total
  100° F.
G—Exhaust Gases from Separator 20
  36,000 ACFM
  240° F.
H—Infeed to Thermal Reactor
  5.00% moisture
  5,487 lbs/hr total
  100° F.
I—Mass Loss as VOCs
  3,857 lbs/hr
  2,329 ACFM
  160 lbs/hr water
J—VOC Combustion
  3,000 Btu/lb VOCs
  3,857 lbs/hr
  11.57 MM Btu/hr
K—Excess Heat
  0.00 ACFM
  0.00 MM Btu/hr
  1,500° F.
L—CF Gases to Dryer 18
  16,474 ACFM
  6.88 MM Btu/hr
  1,500° F.
M—Combustion Air to Fan 26
  23,909 SCFM
  35° F.
  25% X-S air
N—Biochar Output from Reactor 16
  2% moisture
  1,462 lbs/hr total
  900° F.
O—Cooled Biochar Output
  2.00% moisture
  1,462 lbs/hr total
  100° F.
P—Net Salable Biochar Product
  2.00% moisture
  1,462 lbs/hr total
  100° F.
Q—Recycle Gases to Dryer 18
  13,000 ACFM
  27,845 lbs/hr
  2.54 MM Btu/hr
  600° F.

In this example, the dryer 18 operates at 1,035° F. inlet temperature and yields 1,331 Btu/lb of evaporation. The reactor 16 utilizes 855 Btu/lb feedstock and generates 3,210 Btu/lb biochar This system will provide on an annual basis (7200 hours) 5,262 tons of salable biochar. This requires 75,060 tons per year of wet biosolids, 18,000 tons per year of reclaimed biosolids, and a natural gas fuel usage of 97,716 MCF/yr. The conversion ratios are wet to oven-dry (average) 1.99 to 1.00; oven-dry to biochar (average) 3.75 to 1.00; and wet to net biochar (average) 14.26 to 1.00.

The system 10 in this example has a mass yield of 26.64% including fuel, a biochar cooling heat loss of 0.70 MM Btu/hr (dry basis), a total loss of 0.70 MM Btu/hr, an input energy of 25.14 MM Btu/hr, with an energy efficiency of 97.21% and an energy conversion of 14.32%.

Example 2

A wastewater sludge sample was obtained from a US-midwestern municipal wastewater treatment plant. The sample was Class A and had a moisture content of about 5.5% by weight. A portion of the sample was treated in a small, natural gas-fired demonstration thermal reactor of the type described above as reactor 34, at an average temperature of 950° F. and a residence time of about 20 minutes, with a drum rotational speed of about 2-3 rpm. The output from the reactor was cooled to room temperature, and portions of the as-received sludge sample and the reacted material were sent to a commercial laboratory for determination of PFAS compounds. The following results were reported:

As-Received Sample:

| CAS # | Compound | Detected Amount |
| --- | --- | --- |
| 375-22-24 | perfluorobutanoic acid | 4.0 µg/kg |
| 307-24-4 | perfluorohexanoic acid | 14.8 µg/kg |
| 335-67-1 | perfluorooctanoic acid | 20.0 µg/kg |
| 335-76-2 | perfluorodecanoic acid | 9.4 µg/kg |
| 2058-94-8 | perfluoroundecanoic acid | 5.1 µg/kg |

However, the treated sample in accordance with the invention gave null results, i.e., none of the above PFAS compounds were detected.

While the invention has been described in the context of treating wastewater sludges using a natural gas-fired reactor, the invention is not so limited. For example, a variety of feedstocks may be used in the invention, such as those obtained from forest silviculture, agricultural residues, animal litters, municipal biosolids, anaerobic digestates, municipal solid wastes, algaes, and blends thereof. The fuel used by the reactor may be from essentially any source, such as natural gas, propane, fuel oil, coal, or renewable feels such as biomass and VOCs liberated from the process. Additionally, thermal energy may be employed from other sources, such as waste heat from an alternate process or electrical induction.

We claim:

1. A method of remediating contaminants of a feedstock including PFAS and/or MPs, comprising steps of:
    passing said feedstock into a rotating thermal reactor, and moving the feedstock along a length of the reactor;
    heating walls of said thermal reactor during rotation thereof so as to conductively heat said feedstock during said movement thereof, said heating sufficient to substantially volatilize said contaminants; and
    recovering heated feedstock from said reactor,
    said reactor including a shell having an inner face, inwardly extending mixing elements secured to the inner face of said shell, a feedstock input leading to said shell, and a feedstock output leading from said shell,
    wherein said passing step is carried out by moving the feedstock through and past the mixing elements during rotation of the thermal reactor, so that no more than about 10% by weight of the feedstock within the reactor shell is separated from the inner face of said shell during any complete rotation thereof, based upon the total weight of the feedstock in the shell taken as 100% by weight.

2. The method of claim 1, wherein said heating is sufficient to volatilize at least about 95% by weight of said contaminants.

3. The method of claim 2, wherein said heating is sufficient to volatilize at least about 99% by weight of said contaminants.

4. The method of claim 1, wherein said passing step is carried out so that no more than about 5% by weight of the feedstock within the reactor shell is separated from the inner face of said shell during any complete rotation thereof, based upon the total weight of the feedstock in the shell taken as 100% by weight.

5. The method of claim 1, wherein said heating further comprises passing hot combustion gases around the outer surfaces of said rotating thermal reactor.

6. The method of claim 1, further including heating said walls of said thermal reactor so that the feedstock is heated to a temperature of about 300-1400° F.

7. The method of claim 6, wherein the feedstock is heated to a temperature of about 750-1100° F.

8. The method of claim 1, wherein said thermal reactor is rotated at a rate of from about ¼-10 rpm.

9. The method of claim 8, wherein said thermal reactor is rotated at a rate of about ½-4 rpm.

10. The method of claim 1, wherein said passing step is carried out so that the feedstock has a residence time within the thermal reactor of about 8-25 minutes.

11. The method of claim 10, wherein said passing step is carried out so that the feedstock has a residence time within the thermal reactor of about 12-16 minutes.

12. The method of claim 1, wherein said feedstock has a moisture content of up to about 20% by weight, based upon the total weight of said feedstock taken as 100% by weight, prior to said passing step.

13. The method of claim 12, wherein said moisture content is up to about 5% by weight.

14. The method of claim 1, wherein said inwardly extending mixing elements comprise elongated pins, wherein the method further includes conducting heat through said pins.

* * * * *